US012798572B2

(12) United States Patent
Kitamura et al.

(10) Patent No.: US 12,798,572 B2
(45) Date of Patent: Nov. 17, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yuki Kitamura, Tokyo (JP); Shohei Noai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/055,549

(22) Filed: Feb. 18, 2025

(65) Prior Publication Data

US 2025/0304058 A1 Oct. 2, 2025

(30) Foreign Application Priority Data

Mar. 27, 2024 (JP) ................................ 2024-051036

(51) Int. Cl.
*B60W 30/12* (2020.01)
*B60W 50/00* (2006.01)
*G06V 20/56* (2022.01)

(52) U.S. Cl.
CPC ........ *B60W 30/12* (2013.01); *B60W 50/0097* (2013.01); *G06V 20/588* (2022.01);
(Continued)

(58) Field of Classification Search
CPC ............ B60W 30/12; B60W 50/0097; B60W 2420/403; B60W 2552/30;
(Continued)

(56) References Cited

U.S. PATENT DOCUMENTS

2015/0274164 A1 10/2015 Terazawa et al.
2017/0234786 A1* 8/2017 Weber ................ G01M 15/102 73/23.33

(Continued)

FOREIGN PATENT DOCUMENTS

JP 2002-092794 3/2002
JP 2009-234543 10/2009

(Continued)

OTHER PUBLICATIONS

Japanese Office Action for Japanese Patent Application No. 2024-051036 mailed Aug. 26, 2025.

(Continued)

*Primary Examiner* — Joseph J Dallo
(74) *Attorney, Agent, or Firm* — Amin, Turocy & Watson, LLP

(57) ABSTRACT

A vehicle control device includes a recognition part configured to recognize marking lines of a road on which a host vehicle is traveling, a prediction part configured to calculate a predicted route of the host vehicle on the basis of a traveling state of the host vehicle, an intersection determining part configured to determine whether each predetermined sections of the marking lines intersect with the predicted route, and a determining part configured to calculate a margin time until the host vehicle reaches an intersection point between the predicted route and the marking line when it is determined that the predicted route will intersect with the marking line of the predetermined section, and configured to determine that the host vehicle is highly likely to deviate from the marking line when the margin time is equal to or smaller than a threshold.

4 Claims, 8 Drawing Sheets

(52) U.S. Cl.
CPC ... *B60W 2420/403* (2013.01); *B60W 2552/30* (2020.02); *B60W 2552/53* (2020.02)

(58) Field of Classification Search
CPC ....... B60W 2552/53; B60W 30/18145; B60W 40/06; B60W 50/0098; B60W 60/0011; B60W 2420/408; B60W 2552/05; B60W 2552/50; G06V 20/588
See application file for complete search history.

(56) References Cited

U.S. PATENT DOCUMENTS

| | | | | |
|---|---|---|---|---|
| 2021/0201145 | A1* | 7/2021 | Pham | B60W 60/001 |
| 2021/0309221 | A1* | 10/2021 | Alpert | G06V 20/597 |
| 2021/0312193 | A1* | 10/2021 | Alpert | B60W 40/08 |
| 2021/0380115 | A1* | 12/2021 | Alpert | G06V 20/50 |
| 2023/0166743 | A1* | 6/2023 | Heck | G06N 3/044 |
| 2023/0311712 | A1* | 10/2023 | Yamazaki | B60L 58/30 429/428 |
| 2023/0401274 | A1* | 12/2023 | Denninghoff | G06F 16/9577 |
| 2024/0034320 | A1* | 2/2024 | Hidaka | B60W 30/18159 |
| 2024/0092346 | A1* | 3/2024 | Ishii | B60W 40/02 |
| 2024/0092376 | A1* | 3/2024 | Tamura | B60W 30/16 |

FOREIGN PATENT DOCUMENTS

| | | |
|---|---|---|
| JP | 4534754 | 9/2010 |
| JP | 2014-235662 | 12/2014 |
| JP | 2015-189411 | 11/2015 |

OTHER PUBLICATIONS

Japanese Decision of Rejection for Japanese Patent Application No. 2024-051036 mailed Dec. 2, 2025.

* cited by examiner

FIG. 2

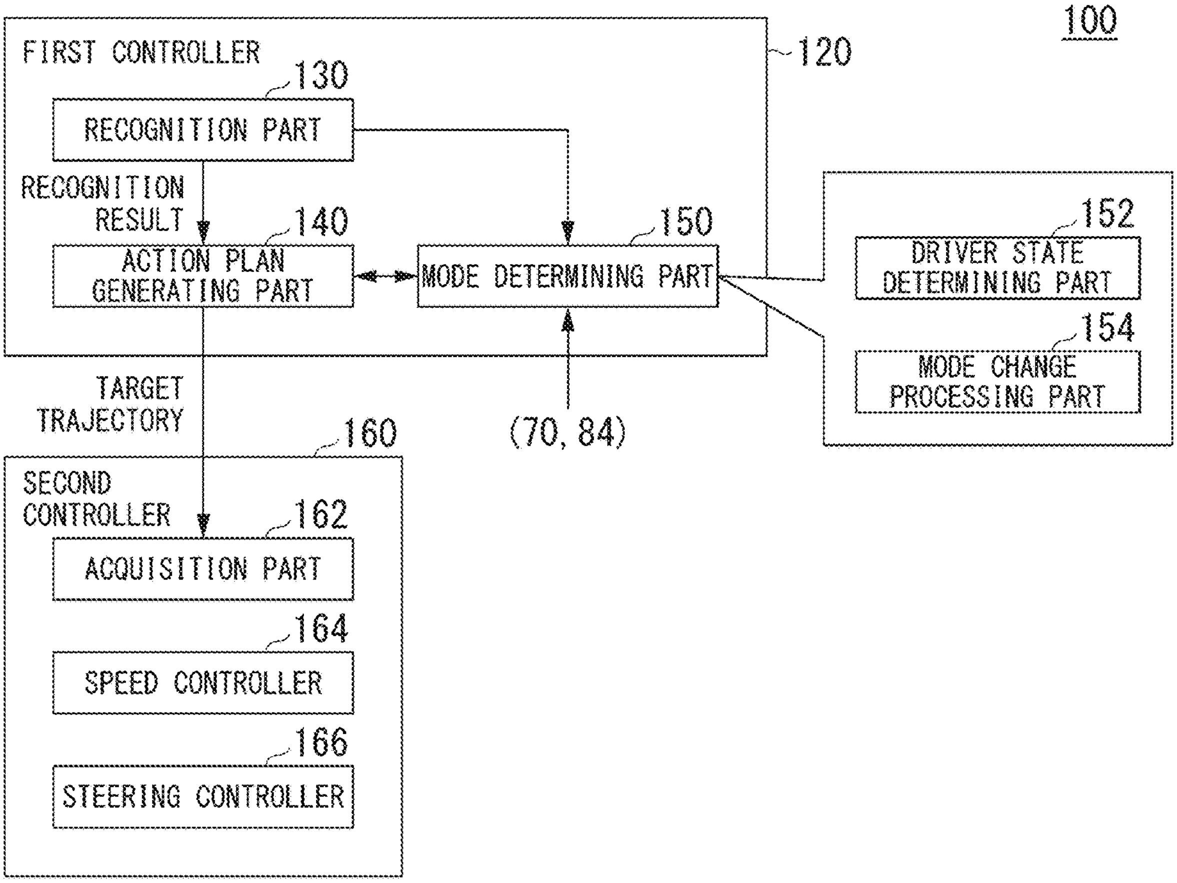

FIG. 3

| DRIVING MODE | CONTROL STATE | TASK |
| --- | --- | --- |
| MODE A | AUTOMATIC DRIVING | FORWARD MONITORING: NOT REQUIRED STEERING GRIP: NOT REQUIRED |
| MODE B | DRIVING ASSISTANCE | FORWARD MONITORING: REQUIRED STEERING GRIP: NOT REQUIRED |
| MODE C | DRIVING ASSISTANCE | FORWARD MONITORING: REQUIRED STEERING GRIP: REQUIRED |
| MODE D | DRIVING ASSISTANCE | FORWARD MONITORING: REQUIRED AT LEAST CERTAIN DRIVING OPERATION IS REQUIRED |
| MODE E | MANUAL DRIVING | FORWARD MONITORING: REQUIRED DRIVING OPERATION IS REQUIRED FOR BOTH STEERING AND ACCELERATION AND DECELERATION |

TASK: LIGHT

TASK: SEVERE

FIRST STEP

SECOND STEP

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2024-051036, filed Mar. 27, 2024, the content of which is incorporated herein by reference.

BACKGROUND OF THE INVENTION

Field of the Invention

The present invention relates to a vehicle control device, a vehicle control method, and a storage medium.

Description of Related Art

In recent years, there have been increasing attempts to provide access to a sustainable transportation system that takes into consideration the most vulnerable traffic participants. To achieve this, research and development into preventive safety technologies to further improve traffic safety and convenience has been focused on. For example, in the related art, there is a technology that detects deviation from a traveling lane for a traveling vehicle (for example, see Japanese Patent No. 4534754).

SUMMARY OF THE INVENTION

In the technology in the related art, deviation is determined by a lateral deviation of a vehicle position from a traveling lane center, and a deviation direction or a deviation avoidance direction is predicted from the yaw angle, and thus, the degree of traveling lane maintenance control is made greater as the tendency of the deviation gets greater. That is, in the technology in the related art, since the deviation determination is based on the lateral deviation, there is a possibility that delays may occur in control or notification when a vehicle is traveling a curve.

An aspect of the present invention is directed to providing a vehicle control device, a vehicle control method, and a storage medium that are capable of appropriately performing deviation determination when a vehicle is traveling on a curve. Further, an aspect of the present invention is directed to contributing to development of a sustainable transportation system.

A vehicle control device according to the present invention employs the following configurations.

(1) A vehicle control device according to an aspect of the present invention is a vehicle control device including: a recognition part configured to recognize marking lines of a road on which a host vehicle is traveling; a prediction part configured to calculate a predicted route of the host vehicle on the basis of a traveling state of the host vehicle; an intersection determining part configured to determine whether each predetermined sections of the marking lines intersect with the predicted route; and a determining part configured to calculate a margin time until the host vehicle reaches an intersection point between the predicted route and the marking line when it is determined that the predicted route will intersect with the marking line of the predetermined section, and configured to determine that the host vehicle is highly likely to deviate from the marking line when the margin time is equal to or smaller than a threshold.

(2) In the aspect of the above-mentioned (1), the intersection determining part may calculate the predicted route using a turning curve based on a current traveling state of the host vehicle when the host vehicle is traveling with a turning movement.

(3) In the aspect of the above-mentioned (1), the determining part may calculate the margin time using a turning curve based on a current traveling state of the host vehicle when the host vehicle is traveling with a turning movement.

(4) In the aspect of the above-mentioned (2) or (3), a center of the turning curve is set to a side of the host vehicle.

(5) In the aspect of the above-mentioned (4), the center is set in a direction perpendicular to a forward direction of a front surface of the host vehicle from an end portion or a ground-contact point of the host vehicle that is closest to the predetermined section.

(6) A vehicle control method according to another aspect of the present invention is provided to cause a control device of a host vehicle to: recognize marking lines of a road on which a host vehicle is traveling; calculate a predicted route of the host vehicle on the basis of a traveling state of the host vehicle; determine whether each predetermined sections of the marking lines intersect with the predicted route; and calculate a margin time until the host vehicle reaches an intersection point between the predicted route and the marking line when it is determined that the predicted route will intersect with the marking line of the predetermined section and determine that the host vehicle is highly likely to deviate from the marking line when the margin time is equal to or smaller than a threshold.

(7) A storage medium according to another aspect of the present invention is a computer-readable non-transitory storage medium on which a program is stored to cause a control device of a host vehicle to: recognize marking lines of a road on which a host vehicle is traveling; calculate a predicted route of the host vehicle on the basis of a traveling state of the host vehicle; determine whether each predetermined sections of the marking lines intersect with the predicted route; and calculate a margin time until the host vehicle reaches an intersection point between the predicted route and the marking line when it is determined that the predicted route will intersect with the marking line of the predetermined section and determine that the host vehicle is highly likely to deviate from the marking line when the margin time is equal to or smaller than a threshold.

According to the aspects of the above-mentioned (1) to (7), it is possible to provide a vehicle control device, a vehicle control method, and a program that are capable of appropriately performing deviation determination when a vehicle is traveling on a curve.

More specifically, according to the aspects of (1), (6) and (7), by calculating the predicted route of the host vehicle with respect to road division lines and finding intersection points, it is possible to suppress delays in control and notification even if there is a possibility of deviation while curve traveling. Further, by determining whether or not there is an intersection point for each predetermined sections of road division lines (intersection determination), a processing load for deviation determination can be reduced and the possibility of determination delays can be reduced.

In addition, according to the aspect of (2), when the host vehicle is traveling with a turning movement, the possibility of deviation can be appropriately determined even while traveling along the curve by performing intersection determination based on the turning curve (turning curvature) calculated from the current traveling state. Further, by performing intersection determination based on turning curves, the processing load can be reduced and the possibility of determination delays can be reduced.

In addition, according to the aspect of (3), when the host vehicle is traveling at a turning movement, the deviation determination can be made based on the turning curve (turning curvature) calculated from the current traveling state, allowing the possibility of deviation to be appropriately determined even while traveling on the curve. Further, by performing deviation determination based on the turning curve, the processing load can be reduced and the possibility of determination delays can be reduced.

In addition, in the technology in the related art, when calculating the turning center (rotation center), if the curvature radius becomes large, the effect of the lateral speed error becomes large, and the deviation distance from the traveling lane may not be calculated correctly. According to the aspect of (4), by setting the turning center to the side of the host vehicle, the accuracy of intersection determination and deviation determination when turning can be improved.

In addition, according to the aspect of (5), the accuracy of deviation determination can be improved by performing deviation determination for areas of the host vehicle's area that are likely to deviate from the traveling lane.

BRIEF DESCRIPTION OF THE DRAWINGS

FIG. 2 is a functional configuration view of a first controller and a second controller.

FIG. 3 is a view showing an example of correspondence of a driving mode, a control state of a host vehicle, and a task.

DETAILED DESCRIPTION OF THE INVENTION

Hereinafter, embodiments of a vehicle control device, a vehicle control method, and a storage medium of the present invention will be described with reference to the accompanying drawings.

[Entire Configuration]

Figure 1:
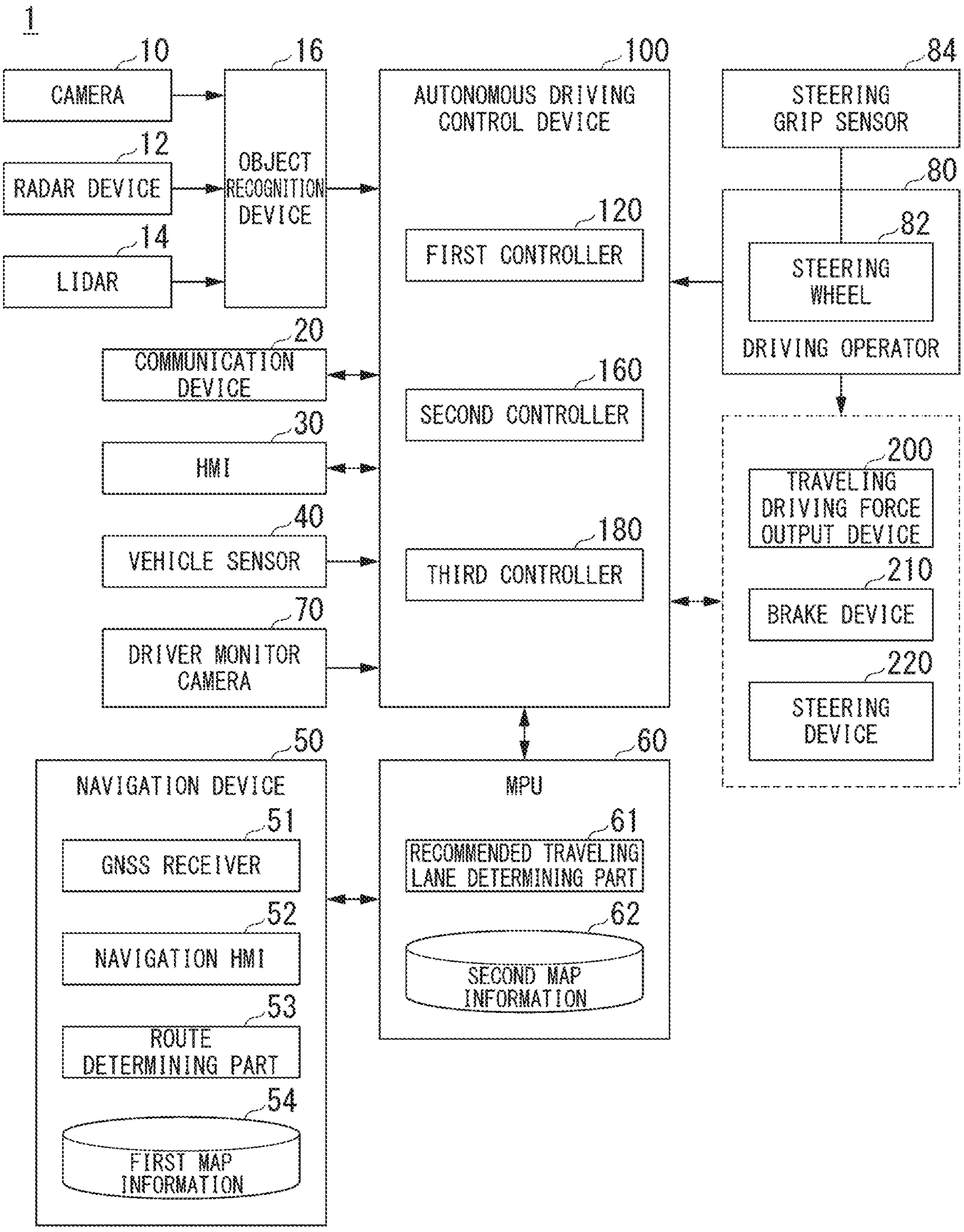
FIG. 1 is a configuration view of a vehicle system using a vehicle control device according to an embodiment.

FIG. 1 is a configuration view of a vehicle system 1 using a vehicle control device according to an embodiment. A vehicle in which the vehicle system 1 is mounted is, for example, a two-wheeled, three-wheeled or four-wheeled vehicle, and a driving source thereof is an internal combustion engine such as a diesel engine or a gasoline engine, an electric motor, or a combination of these. The electric motor runs on electricity generated by a generator connected to the internal combustion engine, or on electricity discharged from a secondary battery or fuel cells.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an autonomous driving control device 100, a traveling driving force output device 200, a brake device 210, and a steering device 220. These devices and equipment are connected to each other by multiple communication lines, such as a controller area network (CAN) communication line, serial communication lines, wireless communication networks, or the like. Further, the configuration shown in FIG. 1 is merely an example, and some of the configuration may be omitted, or other configurations may be added.

The camera 10 is a digital camera using a solid-state imaging device such as a charge coupled device (CCD), a complementary metal oxide semiconductor (CMOS), or the like. The camera 10 is attached to an arbitrary place on a vehicle in which the vehicle system 1 is mounted (hereinafter, a host vehicle). When capturing an image of the front, the camera 10 is attached to a front windshield upper portion, a rearview mirror back surface, or the like. The camera 10 captures images of the surroundings of the host vehicle repeatedly, for example, periodically. The camera 10 may be a stereo camera.

The radar device 12 emits radio waves, such as millimeter waves, around the host vehicle and detects the radio waves reflected by objects (reflected waves) to determine at least a position (distance and azimuth) of the object. The radar device 12 is attached to an arbitrary place on the host vehicle. The radar device 12 may detect the position and speed of the object using a frequency modulated continuous wave (FM-CW) method.

The LIDAR 14 emits light (or electromagnetic waves with a wavelength close to the light) to the surroundings of the host vehicle, and measures scattered light. The LIDAR 14 detects the distance to the subject on the basis of the time between light emission and reception. The emitted light is, for example, a pulsed laser beam. The LIDAR 14 is attached to an arbitrary place on the host vehicle.

The object recognition device 16 performs sensor fusion processing on some or all of the detection results from the camera 10, the radar device 12, and the LIDAR 14 to recognize the position, the type, the speed, or the like, of the object. The object recognition device 16 outputs the recognition results to the autonomous driving control device 100. The object recognition device 16 may output the detection results of the camera 10, the radar device 12, and the LIDAR 14 to the driver assistance device 100 without modifying them. The object recognition device 16 may be omitted from the vehicle system 1.

The communication device 20 communicates with other vehicles in the vicinity of the host vehicle using, for example, a cellular network, a Wi-Fi network, Bluetooth (Registered trademark), dedicated short range communication (DSRC), etc., or communicates with various server devices via a wireless base station.

The HMI 30 presents various pieces of information to the occupant of the host vehicle and accepts input operations from the occupant. The HMI 30 includes various display devices, a speaker, a buzzer, a touch panel, a switch, a key, and the like.

The vehicle sensor 40 includes a vehicle speed sensor configured to detect a speed of the host vehicle, an acceleration sensor configured to detect acceleration, a yaw rate sensor configured to detect an angular speed around a vertical axis, an azimuth sensor configured to detect an orientation of the host vehicle, and the like.

The navigation device 50 includes, for example, a global navigation satellite system (GNSS) receiver 51, a navigation HMI 52, and a route determining part 53. The navigation device 50 holds first map information 54 on a storage device such as a hard disk drive (HDD), a flash memory, or the like. The GNSS receiver 51 specifies a position of the host vehicle on the basis of the signal received from a GNSS satellite. The position of the host vehicle may be specified or supplemented by an inertial navigation system (INS) using the output of the vehicle sensor 40. The navigation HMI 52 includes a display device, a speaker, a touch panel, a key, and the like. The navigation HMI 52 may be partially or completely shared with the HMI 30 described above. The route determining part 53 determines, for example, a route (hereinafter, a route on map) to a destination input by an occupant using the navigation HMI 52 from a position of the host vehicle (or an arbitrary position that was input) specified by the GNSS receiver 51 with reference to the first map information 54. The first map information 54 is, for example, information that represents a shape of a road using links that indicate roads and nodes connected by the links. The first map information 54 may include a curvature of a road, point of interest (POI) information, or the like. The route on map is output to the MPU 60. The navigation device 50 may perform route guidance using the navigation HMI 52 on the basis of the route on map. The navigation device 50 may be realized by, for example, a function of a terminal device such as a smartphone, a tablet terminal, or the like, held by the occupant. The navigation device 50 may transmit the current position and destination to a navigation server via the communication device 20, and acquire the same route as the route on map from the navigation server.

The MPU 60 includes, for example, a recommended traveling lane determining part 61 and stores second map information 62 in a storage device such as a HDD, a flash memory, or the like. The recommended traveling lane determining part 61 divides the route on map provided by the navigation device 50 into a plurality of blocks (for example, every 100 m in terms of a direction of advance of the vehicle) and determines a recommended traveling lane for each block by referring to the second map information 62. The recommended traveling lane determining part 61 determines which traveling lane from the left to travel in. The recommended traveling lane determining part 61 determines the recommended traveling lane for the host vehicle when a branch point exists on the route on map, so that the host vehicle can travel a reasonable route to proceed to the branch destination.

The second map information 62 is map information more accurate than the first map information 54. The second map information 62 includes, for example, information of a traveling lane center, information of a traveling lane boundary, or the like. In addition, the second map information 62 may include road information, traffic regulation information, address information (address and postal code), facility information, telephone number information, information of a prohibition section in which a mode A or a mode B are prohibited, which will be described below, and the like. The second map information 62 may be updated at any time by the communication device 20 communicating with other devices.

The driver monitor camera 70 is, for example, a digital camera using a solid-state imaging device such as a CCD, a CMOS, or the like. The driver monitor camera 70 is attached to an arbitrary place in the host vehicle in a position and orientation that enables the camera to image a portion of the head of the occupant (hereinafter referred to as the driver) seated in the driver's seat of the host vehicle from the front side (in an orientation that images the face). For example, the driver monitor camera 70 is attached to an upper portion of the display device installed in the center portion of the installment panel of the host vehicle.

The driving operator 80 includes, for example, an accelerator pedal, a brake pedal, a shift lever, and other operators, in addition to a steering wheel 82. The driving operator 80 is equipped with a sensor configured to detect the amount of operation or the presence or absence of operation, and the detection results are output to the autonomous driving control device 100, or some or all of the traveling driving force output device 200, the brake device 210, and the steering device 220. The steering wheel 82 is an example of "an operator configured to receive a steering operation by the driver." The operator does not necessarily have to be annular, and may be in the form of an irregular steering wheel, a joystick, a button, or the like. A steering grip sensor 84 is attached to the steering wheel 82. The steering grip sensor 84 is realized by a capacitance sensor or the like, and outputs a signal to the autonomous driving control device 100 that can detect whether the driver is gripping the steering wheel 82 (meaning that the driver is in contact with the steering wheel in a state where a force can be applied).

The autonomous driving control device 100 includes, for example, a first controller 120, a second controller 160 and a third controller 180. Each of the first controller 120 and the second controller 160 is realized by executing, for example, a program (software) using a hardware processor such as a central processing unit (CPU) or the like. In addition, some or all of these components may be realized by hardware (circuit part; including circuitry) such as large scale integration (LSI), a application specific integrated circuit (ASIC), a field-programmable gate array (FPGA), a graphics processing unit (GPU), a system on chip (SOC), or the like, or cooperation of software and hardware. The program may be stored in a storage device such as an HDD, a flash memory, or the like, (a storage device including a non-transitory storage medium) of the autonomous driving control device 100, or may be stored in a detachable storage medium such as a DVD, a CD-ROM, or the like, in advance, or may be installed in a HDD or a flash memory of the autonomous driving control device 100 by mounting a storage medium (non-transitory storage medium) in a drive device. The autonomous driving control device 100 is an example of "the vehicle control device," and a combination of an action plan generation part 140 and the second controller 160 is an example of "a driving controller."

FIG. 2 is a functional configuration view of the first controller 120 and the second controller 160. The first controller 120 includes, for example, a recognition part 130, the action plan generation part 140, and a mode determining part 150. The first controller 120 performs functions based on, for example, artificial intelligence (AI) and a pre-defined model in parallel. For example, a function of "recognizing an intersection point" can be realized by performing recognition of intersection points using deep learning or the like in parallel with recognition based on pre-defined conditions (such as signals and road signs that can be pattern etched), and then assigning a score to both and evaluating them comprehensively. Accordingly, the reliability of autonomous driving is guaranteed.

The recognition part 130 recognizes a state of the object around the host vehicle such as a position, a speed, acceleration, or the like, on the basis of the information input from the camera 10, the radar device 12, and the LIDAR 14 via the object recognition device 16. The position of the object is recognized, for example, as a position on absolute coordinates using a representative point (a center of gravity, a driving shaft center, or the like) of the host vehicle as an origin, and used in control. The position of the object may be expressed by a representative point such as a center of gravity, corners of the object, or may be expressed by a region. The "state" of the object may include acceleration or jerk of the object, or "a behavioral state" (for example, whether traveling lane change is performed or going to be performed).

In addition, recognition part 130 recognizes, for example, the traveling lane in which the host vehicle is traveling (traveling lane). For example, the recognition part 130 recognizes the traveling lane by comparing a pattern of road division lines (for example, an arrangement of solid lines and broken lines) obtained from the second map information 62 with a pattern of road division lines around the host vehicle recognized from the image captured by the camera 10. Further, the recognition part 130 may recognize a traveling lane by recognizing track boundaries (road boundaries), which are not limited to the road division lines but include road division lines, shoulders, curbs, median strips, guard rails, and the like. This recognition may take into account the position of the host vehicle obtained from the navigation device 50 and the processing results from the INS. The recognition part 130 recognizes stop lines, obstacles, red signals, toll gates, and other road incidents.

When recognizing the traveling lane, the recognition part 130 recognizes the position or posture of the host vehicle relative to the traveling lane. The recognition part 130 may recognize, for example, a deviation of the reference point of the host vehicle from the traveling lane center and an angle of the direction of advance of the host vehicle relative to a line connecting the traveling lane centers as the relative position and posture of the host vehicle with respect to the traveling lane. On the other hand, the recognition part 130 may recognize the position of the reference point of the host vehicle relative to any side end portion of the traveling lane (road division lines or road boundaries) as the relative position of the host vehicle relative to the traveling lane.

The action plan generation part 140 generates a target trajectory for the host vehicle to travel in the future (without relying on the driver's operation) automatically so that the host vehicle will basically travel in the recommended traveling lanes determined by the recommended traveling lane determining part 61 and further avoid approaching objects (except for crossover objects such as road division lines, road signs, and manholes) recognized by the recognition part 130. For example, the recognition part 130 sets a risk region which has the object, which the state thereof was output, in the center, and within the risk region, the recognition part 130 sets a risk as an index value indicating the degree to which the host vehicle should not approach. The action plan generation part 140 generates a target trajectory that does not pass through any point where the risk is equal to or greater than a predetermined value. Since the object includes moving objects, the risk distribution is not one per control cycle, but is set for multiple future time points, taking into account the predicted future position of the object based on the speed of the object. The target trajectory includes, for example, a speed element. For example, the target trajectory is represented as a sequence of points (trajectory points) that the host vehicle should reach. The trajectory point is a point that the host vehicle should reach for a predetermined traveling distance (for example, a few meters) along the road, and in addition, the target speed and target acceleration are generated as part of the target trajectory for each predetermined sampling time (for example, a few tenths of a second). In addition, the trajectory point may be the position that the host vehicle should reach at each predetermined sampling time. In this case, information on the target speed and target acceleration is expressed as an interval between trajectory points.

The action plan generation part 140 may set autonomous driving events when generating a target trajectory. The autonomous driving events include a fixed speed traveling event, a low speed following traveling event, a traveling lane change event, a diverging event, a merging event, a takeover event, and the like. The action plan generation part 140 generates a target trajectory according to a triggered event.

The mode determining part 150 determines the driving mode of the host vehicle to one of a plurality of driving modes that have different tasks assigned to the driver. The mode determining part 150 includes, for example, a driver state determining part 152, and a mode change processing part 154. These individual functions will be described below.

FIG. 3 is a showing an example of correspondence between a driving mode, a control state of the host vehicle, and a task. A driving mode of the host vehicle includes, for example, five modes of the mode A to a mode E. The control state, i.e., the degree of automation of the driving control of the host vehicle, is highest in the mode A, followed by the mode B, the mode C and the mode D, with the mode E being the lowest. Conversely, the tasks imposed on the driver are the lightest in the mode A, followed by the mode B, the mode C and the mode D, and the severest in the mode E. Further, in the modes D and E, the control state is not autonomous driving, so the autonomous driving control device 100 is responsible for ending control related to autonomous driving and transitioning to driver assistance or manual driving. Hereinafter, the contents of each driving mode are illustrated below.

In the mode A, the vehicle enters an autonomous driving state, and the driver is no longer required to monitor the road ahead or grip the steering wheel 82 (steering grip in the drawing). However, even in the mode A, the driver is required to be ready to quickly switch to manual driving in response to a request from the system centered on the autonomous driving control device 100. Further, the autonomous driving disclosed herein means that both steering and acceleration and deceleration are controlled independently of the operation of the driver. The term "ahead" means the space in the direction of advance of the host vehicle as viewed through the front windshield. The mode A is an executable driving mode when certain conditions are satisfied, for example, a road for automobiles only such as a highway, the host vehicle is traveling at or below a predetermined speed (for example, about 50 km/h) and there is a preceding vehicle for the subject to follow, and is sometimes called a traffic jam pilot (TJP). When this condition is no longer satisfied, the mode determining part 150 changes the driving mode of the host vehicle to the mode B.

In the mode B, the driver enters the driver assistance state, and the driver is assigned the task of monitoring the area ahead of the host vehicle (hereafter referred to as "forward monitoring"), but is not assigned the task of gripping the steering wheel 82. In the mode C, the vehicle enters the driver assistance state, and the driver is assigned the tasks of forward monitoring and gripping the steering wheel 82. The mode D is a driving mode that requires some degree of driving operation by the driver with respect to at least one of the steering and the acceleration and deceleration of the host vehicle. For example, in the mode D, driver assistance such as adaptive cruise control (ACC) or lane keeping assist system (LKAS) is provided. In the mode E, this is a manual driving state in which both steering and acceleration and deceleration require the driving operation by the driver. In both of the modes D and E, the driver is naturally assigned the tasks of monitoring the area ahead of the host vehicle.

The autonomous driving control device 100 (and a driver assistance device (not shown)) performs automatic lane changes according to the driving mode. There are two types of automatic lane changes: automatic lane changes (1) requested by the system and automatic lane changes (2) requested by the driver. The automatic lane changes (1) are automatic lane changes for overtaking, which are performed when the speed of the preceding vehicle is slower than a certain standard compared to the speed of the vehicle, and automatic lane changes for proceeding toward the destination (automatic lane changes due to a change to a recommended lane). The automatic lane change (2) changes lanes of the host vehicle in the direction of the operation when the driver operates the direction indicator in the case in which conditions related to speed and positional relations with surrounding vehicles are met.

In the mode A, the autonomous driving control device 100 does not perform either of the automatic lane changes (1) and (2). In the modes B and C, the autonomous driving control device 100 performs both the automatic lane changes (1) and (2). In the mode D, the driver assistance device (not shown) does not perform the automatic lane change (1) but performs the automatic lane change (2). In the mode E, neither the automatic lane changes (1) nor (2) are performed.

When the driver does not execute a task related to the determined driving mode (hereinafter, the current driving mode), the mode determining part 150 changes the driving mode of the host vehicle to a driving mode with a more severe task.

For example, when the driver is in a posture in which the driver cannot switch to manual driving in response to a request from the system in mode A (for example, when the driver continues to look away from the vehicle outside the permitted area or when signs of driving difficulty are detected), the mode determining part 150 uses the HMI 30 to prompt the driver to switch to the manual driving, and if the driver does not comply, the mode determining part 150 controls the host vehicle by gradually bringing it to a stop by moving it closer to the shoulder of the road, thereby terminating the autonomous driving. After the autonomous driving is terminated, the host vehicle enters the state of the mode D or E, and the host vehicle will be possible to start traveling by manual operation by the driver. Hereinafter, the same applies to "the termination of autonomous driving." When the driver is not monitoring the road ahead in the mode B, the mode determining part 150 uses the HMI 30 to prompt the driver to monitor the road ahead, and if the driver does not respond, it controls the host vehicle by gradually bringing it to a stop by moving it closer to the shoulder of the road, thereby terminating the autonomous driving. When the driver is not monitoring the road ahead or is not gripping the steering wheel 82 in the mode C, the mode determining part 150 uses the HMI 30 to prompt the driver to monitor the road ahead and/or grip the steering wheel 82, and if the driver does not comply, the mode determining part 150 controls the host vehicle by gradually bringing it to a stop by moving it closer to the shoulder of the road, thereby terminating the autonomous driving.

The driver state determining part 152 monitors the driver state for the above-mentioned mode change and determines whether the driver state is in a state corresponding to the task. For example, the driver state determining part 152 analyzes the image captured by the driver monitor camera 70, performs posture estimation processing, and determines whether the driver is in a posture that does not allow the driver to switch to the manual driving in response to a request from the system. In addition, the driver state determining part 152 analyzes the image captured by the driver monitor camera 70, performs gaze estimation processing, and determines whether the driver is looking ahead.

The mode change processing part 154 performs various types of processing for mode change. For example, the mode change processing part 154 instructs the action plan generation part 140 to generate a target trajectory for stopping at the shoulder of the road, provides operation instructions to the driver assistance device (not shown), or controls the HMI 30 to prompt the driver to take action.

The second controller 160 controls the traveling driving force output device 200, the brake device 210, and the steering device 220 so that the host vehicle travels along the target trajectory generated by the action plan generation part 140 at the scheduled time.

Returning to FIG. 2, the second controller 160 includes, for example, an acquisition part 162, a speed controller 164, and a steering controller 166. The acquisition part 162 acquires information of the target trajectory (trajectory point) generated by the action plan generation part 140 and stores it in memory (not shown). The speed controller 164 controls the traveling driving force output device 200 or the brake device 210 based on the speed element associated with the target trajectory stored in the memory. The steering controller 166 controls the steering device 220 according to the curvature of the target trajectory stored in the memory. The processing of the speed controller 164 and the steering controller 166 is realized, for example, by a combination of feed-forward control and feedback control. As an example, the steering controller 166 performs a combination of feed-forward control based on the curvature of the road ahead of the host vehicle and feedback control based on deviation from the target trajectory.

The traveling driving force output device 200 outputs a traveling driving force (torque) to the driving wheels so that the vehicle travels. The traveling driving force output device 200 includes a combination of, for example, an internal combustion engine, an electric motor, and a gearbox, as well as an electronic control unit (ECU) that controls these. The ECU controls the above configuration according to the information input from the second controller 160 or the information input from the driving operator 80.

The brake device 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the second controller 160 or the information input from the driving operator 80 so that the brake torque corresponding to the braking operation is output to each wheel. The brake device 210 may be provided with a mechanism that transmits a hydraulic pressure generated by an operation of the brake pedal included in the driving operator 80 to the cylinder via the master cylinder as a backup. Further, the brake device 210 is not limited to the configuration described above, but may be an electronically controlled hydraulic brake device that controls the actuator according to information input from the second controller 160 and transmits the hydraulic pressure of the master cylinder to the cylinder.

The steering device 220 includes, for example, a steering ECU, and an electric motor. The electric motor applies, for example, a force to a rack and pinion mechanism to change a direction of a steered wheel. The steering ECU drives the electric motor and changes the direction of the steered wheels according to the information input from the second controller 160 or the information input from the driving operator 80.

The third controller 180 determines whether the host vehicle traveling on a curve is predicted to deviate from a traveling lane (deviation determination). More specifically, the third controller 180 recognizes the positional relation between the traveling lane and the host vehicle and the traveling state of the host vehicle based on the recognition result of the object recognition device 16, the detection result of the vehicle sensor 40, map information (first map information and/or second map information), or the like, and predicts the time it will take for the host vehicle to deviate from the traveling lane when it continues to curve traveling in the current traveling state (hereinafter referred to as time to traveling lane crossing (TTLC)) from these recognition results. Then, the third controller 180 determines that the host vehicle is likely to deviate from the traveling lane when the predicted result of the TTLC is equal to or less than the predetermined time.

In general, when the vehicle is traveling on a curve, the steering angle or the vehicle speed is controlled by the driver or a control function to prevent the vehicle from deviating from the traveling lane. This type of control changes from moment to moment depending on the vehicle's situation and changes in curvature while traveling along a curve. For this reason, the third controller 180 repeatedly performs deviation determinations at each predetermined control period while the host vehicle is traveling on the curve. The third controller 180 may be configured to perform predetermined processing in response to the determination result of the deviation determination. For example, the third controller 180 may be configured to notify the occupant of the deviation determination via the HMI 30 or the navigation device 50 when a deviation of the host vehicle is predicted. In addition, for example, the third controller 180 may be configured to cooperate with the first controller 120 and the second controller 160 to control the vehicle speed and the steering angle in order to suppress the deviation of the host vehicle when the deviation of the host vehicle is predicted.

[Basic Flow of Deviation Determination]

Figure 4:
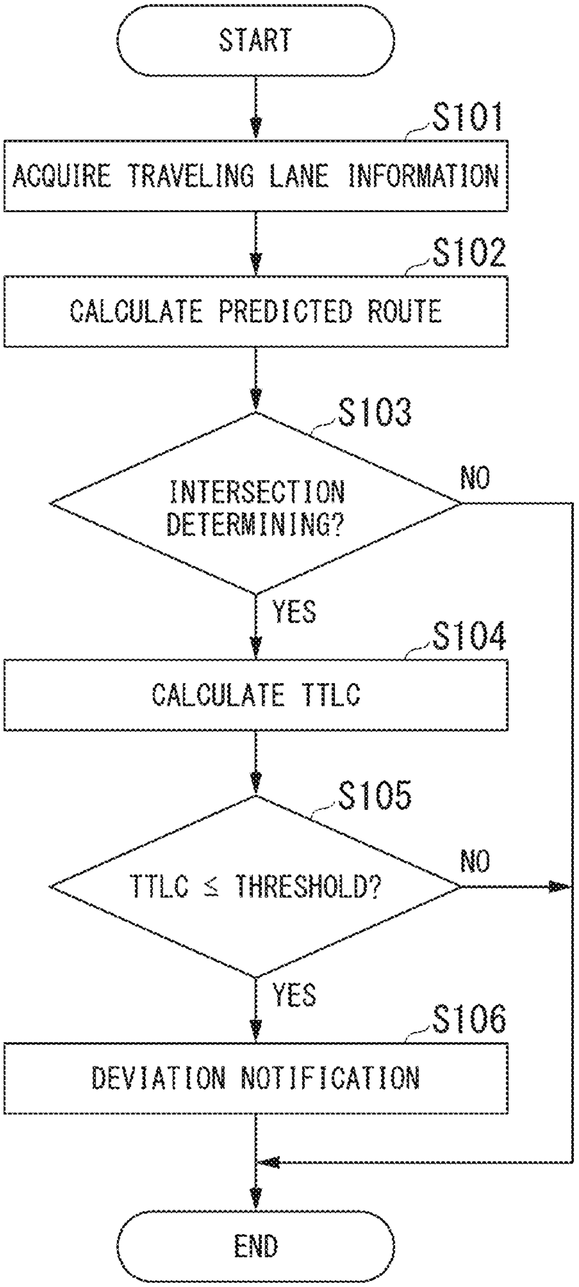
FIG. 4 is a flowchart showing an example of a flow of basic processing in deviation determination.
Figure 5:
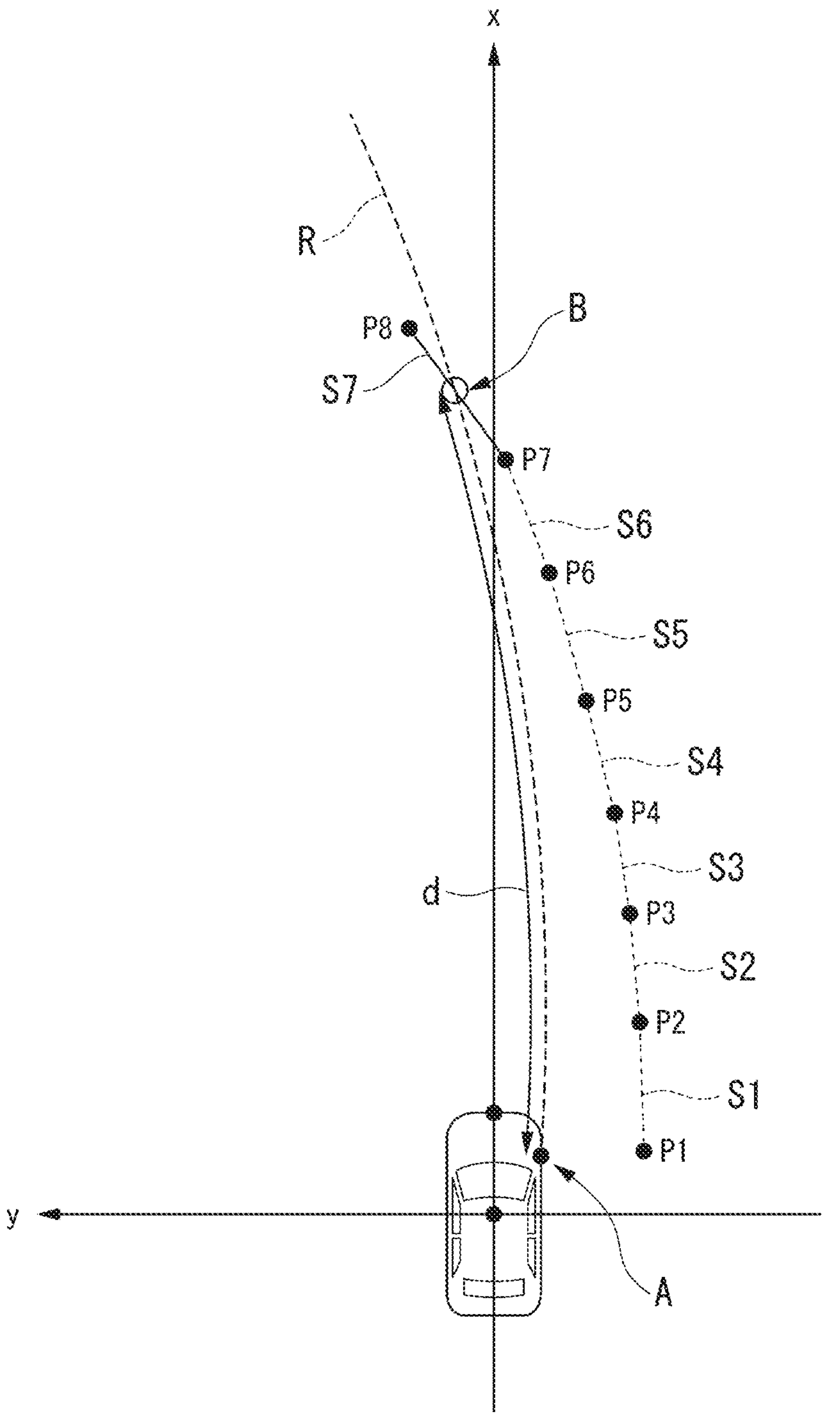
FIG. 5 is an image view for describing the deviation determination in brief.

FIG. 4 is a flowchart showing an example of a flow of basic processing in the deviation determination. FIG. 5 is an image view for describing summary of the deviation determination. Hereinafter, the flow of the processing in FIG. 4 will be described with reference to FIG. 5. First, the third controller 180 acquires traveling lane information of a traveling lane along which the host vehicle is traveling (S101). The traveling lane information is information that represents marking lines of a traveling lane as point groups for each predetermined interval. Further, while the accuracy of deviation determination decreases if the point group interval is too large, since the control period of the deviation determination becomes short and the processing load increases if the point group interval is too short, it is recommended that the point group interval be designed to an appropriate interval (for example, 1 m interval) depending on the processing performance, desired determination accuracy, or the like. In addition, while the processing load increases if the marking line subject to processing in each control period is too long (i.e., if there are too many point groups), since it becomes difficult to predict the traveling lane deviation if the marking line subject to processing is too short, the length of the marking line subject to processing in each control period may be designed to an appropriate length (for example, 100 m or the like) depending on the processing performance, predictability of the traveling lane deviation, or the like. For example, as shown in FIG. 5, regarding the marking line which is further from the curvature center of the curve, the traveling lane information may be obtained as a group of coordinates Pn={P1, P2, P3, . . . } indicating the relative position with respect to the host vehicle. Hereinafter, this group Pn is referred to as a marking line point group Pn.

Next, the third controller 180 calculates a predicted route for the host vehicle based on the vehicle speed and the yaw rate of the host vehicle (S102), and determines whether the predicted route intersects with the marking line (S103: intersection determination). Here, when it is determined that the predicted route does not intersect with the marking line, i.e., when there is no intersection between the predicted route and the marking line, the third controller 180 terminates the deviation determination of the period. Meanwhile, in S103, when it is determined that the predicted route will intersect with the marking line, i.e., when there is an intersection between the predicted route and the marking line, the third controller 180 calculates the predicted time (TTLC) until the host vehicle reaches an intersection position (S104), and determines whether the TTLC is equal to or less than a predetermined threshold (S105). Here, when it is determined that the predicted time is greater than the threshold, the third controller 180 terminates the deviation determination of the period. Meanwhile, in S105, when it is determined that the predicted time is equal to or smaller than the threshold, the third controller 180 notifies the host vehicle that it is deviating from the traveling lane (S106: deviation notification), and terminates the deviation determination of the period.

FIG. 5 is an example of a case in which a predicted route R of the host vehicle intersects with a line segment S7 formed by P7 and P8 among the marking line point group Pn. In this case, the third controller 180 calculates the predicted route R of the host vehicle and determines whether a line segment n (n=1, 2, . . . ) formed by two adjacent points of the marking line point group Pn intersects with the predicted route R, starting with the one closest to the host vehicle. Here, the line segment n is the line segment formed by Pn and Pn+1. In the case of FIG. 5, the third controller 180 can detect an intersection B between the predicted route R and the marking line in the line segment S7 (n=7) by determining whether the line segment intersects with the predicted route R (intersection determination), starting from a line segment S1 (n=1). Hereinafter, the point where the predicted route and the marking line intersect is referred to as "a departure point." The third controller 180 can calculate the time it takes for the host vehicle to reach a departure point B from the initial position as TTLC.

More specifically, the third controller 180 calculates the moving trajectory of the area of the host vehicle that is most likely to first intersect with (deviate from) the marking line (hereinafter referred to as the "subject area") as the predicted route R of the host vehicle. Here, as an example, an outer side end portion of a right front tire of the host vehicle is defined as a subject area, but other areas may be defined as the subject area from a similar perspective. For example, the ground-contact point of the right front tire may be the subject area, or the right end portion of the front of the vehicle may be the subject area. The third controller 180 can obtain the TTLC by calculating a distance d (hereinafter referred to as the "deviation route length") from an initial position A to the departure point B in the subject area and dividing the deviation route length d by the moving speed of the subject area.

Returning to FIG. 4, the aspect of the notification (hereinafter, referred to as "deviation notification") in S105 may be display of information by the HMI 30 or the navigation device 50, or may be output of sound by the navigation device 50. In addition, the aspect of the deviation notification may be output of the determination result with respect to another functional part (for example, the first controller 120, the second controller 160, or the like). In this case, the other functional part may be configured to receive the deviation notification and perform the predetermined operation. For example, when receiving a deviation notification, the first controller 120 may be configured to generate a target trajectory that suppresses traveling lane deviation according to the traveling state of the host vehicle at that time. In addition, for example, when receiving the deviation notification, the second controller 160 may be configured to perform speed control and/or steering control to suppress traveling lane deviation depending on the traveling state of the host vehicle at that time.

Further, when the threshold of the TTLC is too large, the hurdle for deviation notification will be lowered, even situations that do not require much attention will be notified, and deviation notifications that require high attention may be mixed up with other deviation notifications, increasing the risk level. In addition, when the TTLC threshold is too large, the frequency of deviation notifications will increase, which may cause more inconvenience to occupants. Meanwhile, when the TTLC threshold is too small, there will be no time to recover the host vehicle's behavior after receiving the deviation notification, which may increase the risk level. For this reason, the TTLC threshold should be designed to an appropriate value (for example, 1 second) from the viewpoint of occupant comfort and safety.

In addition, when the control period is too short, the number of point groups that can be processed will decrease, whereas when the control period is too long, traveling lane deviations cannot be detected at the required timing. For this reason, the control period may be designed to be an appropriate value (for example, 10 milliseconds) from the viewpoint of the number of point groups to be processed in one period and the detection timing required for traveling lane deviation. Each of the above-mentioned design elements is set appropriately to provide an appropriate combination of values in relation to other design elements.

[Turning Speed and Turning Center of Host Vehicle]

Figure 6:
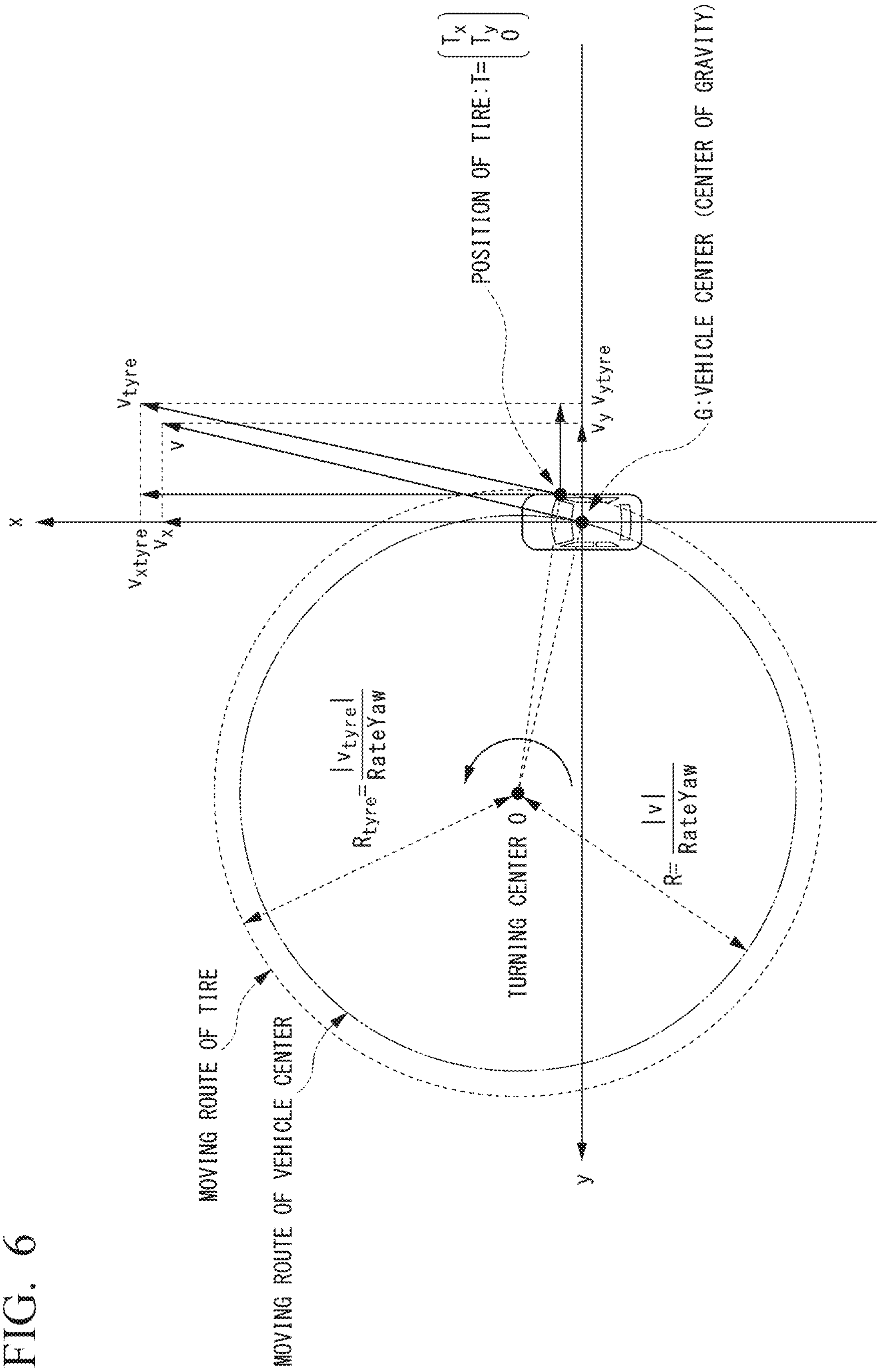
FIG. 6 is a view for describing a method of calculating a turning speed and a turning center of the host vehicle during curve traveling in the deviation determination.

FIG. 6 is a view for describing a method of calculating a turning speed and a turning center of the host vehicle during curve traveling in the deviation determination. As described in FIG. 5, to calculate the deviation route length, it is necessary to predict the traveling route of the host vehicle. The host vehicle traveling on a curve (a curvature X) is considered to perform a turning movement on the circumference of the curvature X. For this reason, in the embodiment, to predict the traveling route of the host vehicle, first, the location of the center (turning center) of the turning movement is obtained. FIG. 6 represents a situation in which the host vehicle is making a turning movement at a speed v with a turning center O as the center. Here, a direction of movement of the host vehicle is a normal direction (a direction of a vector v) at a point G on a circle whose radius is the length from the turning center O to the center (center of gravity) G of the host vehicle. An xy coordinate system in FIG. 6 is an orthogonal coordinate system with its origin at a center G of the host vehicle, and an x-axis is parallel to the front surface direction of the host vehicle. In this case, the speed $v_{tyre}$, at which the position of the subject area (hereinafter, simply referred to as a tire) changes, can be expressed by the following Equation (1)

[Math. 1]

$$v_{tyre} = \begin{pmatrix} v_{x\_tyre} \\ v_{y\_tyre} \\ 0 \end{pmatrix} = v + RateYaw \times T = \begin{pmatrix} v_x \\ v_y \\ 0 \end{pmatrix} + \begin{pmatrix} 0 \\ 0 \\ RateYaw \end{pmatrix} \times \begin{pmatrix} T_x \\ T_y \\ 0 \end{pmatrix} = \begin{pmatrix} v_x - RateYaw * T_y \\ v_y + RateYaw * T_x \\ 0 \end{pmatrix} \tag{1}$$

In Equation (1), $v_{x\_tyre}$ is an x direction component of the speed $v_{tyre}$, and $v_{y\_tyre}$ is a y direction component of the speed $v_{tyre}$. In addition, Rate Yaw is a yaw rate according to the turning movement of the host vehicle. In addition, $v_x$ is an x direction component of the moving speed v of the center G of the host vehicle, and $v_y$ is a y direction component. Tx is an x coordinate component and Ty is a y coordinate component of the tire position. Equation (1) is obtained by combining rotational motion and translational motion based on the equation of motion of a rigid body. In addition, in this case, a turning radius of a tire can be expressed by the following Equation (2).

[Math. 2]

$$R_{tyre} = \frac{|v_{tyre}|}{RateYaw} \tag{2}$$

Figure 7:
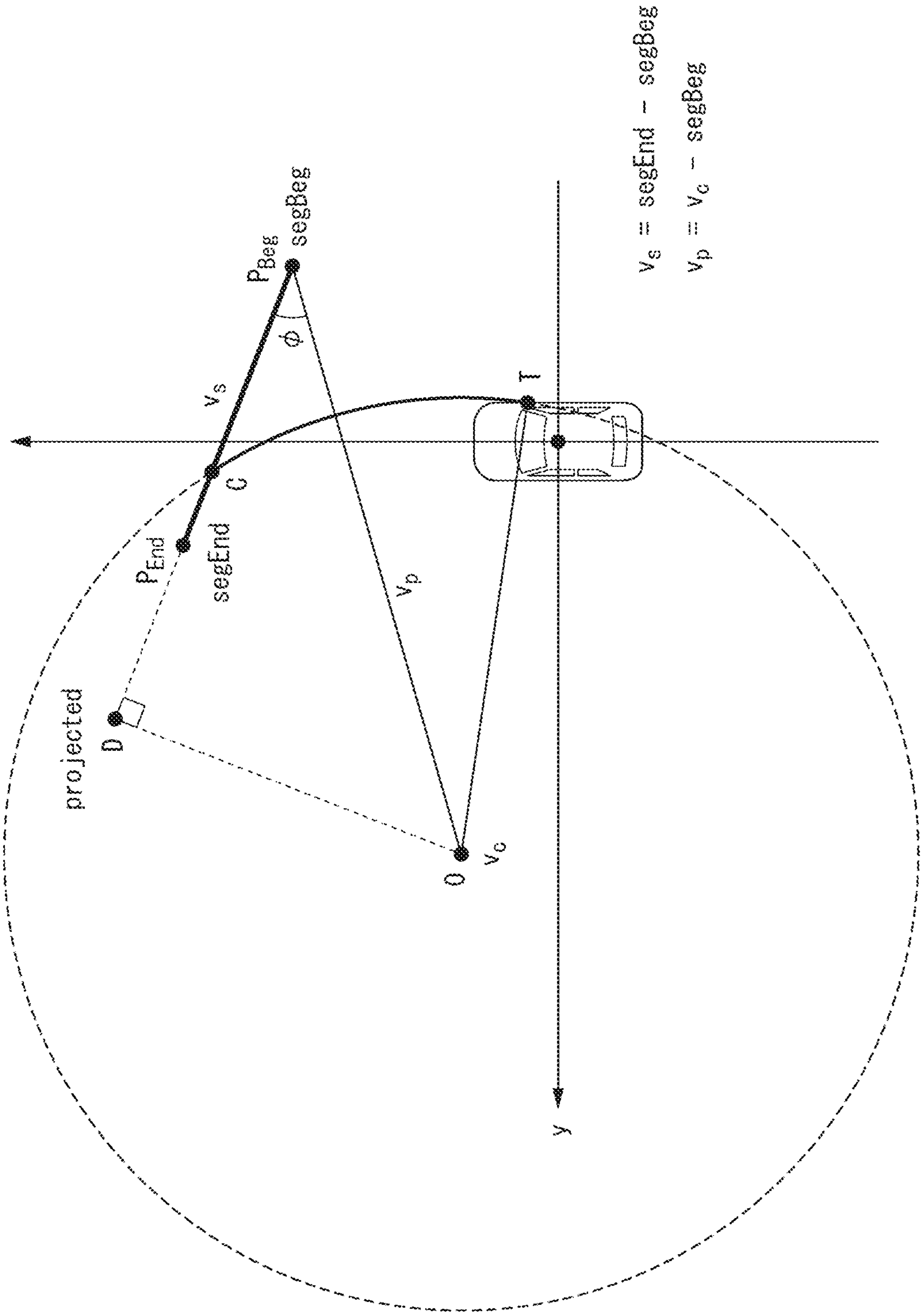
FIG. 7 is a first view for describing a method of calculating a deviation route length of the host vehicle during the curve traveling in the deviation determination.
Figure 8:
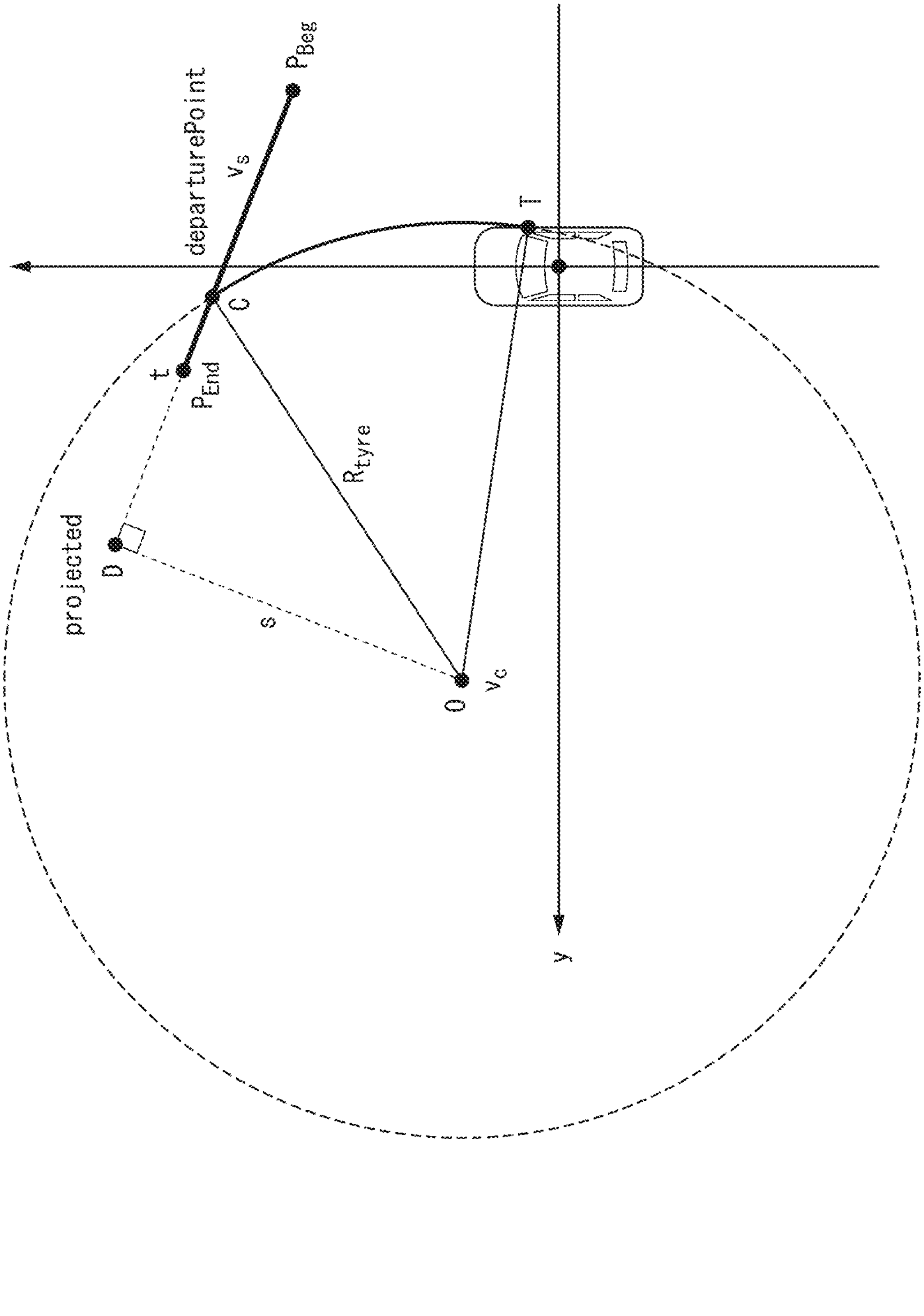
FIG. 8 is a second view for describing the method of calculating the deviation route length of the host vehicle during the curve traveling in the deviation determination.
Figure 9:
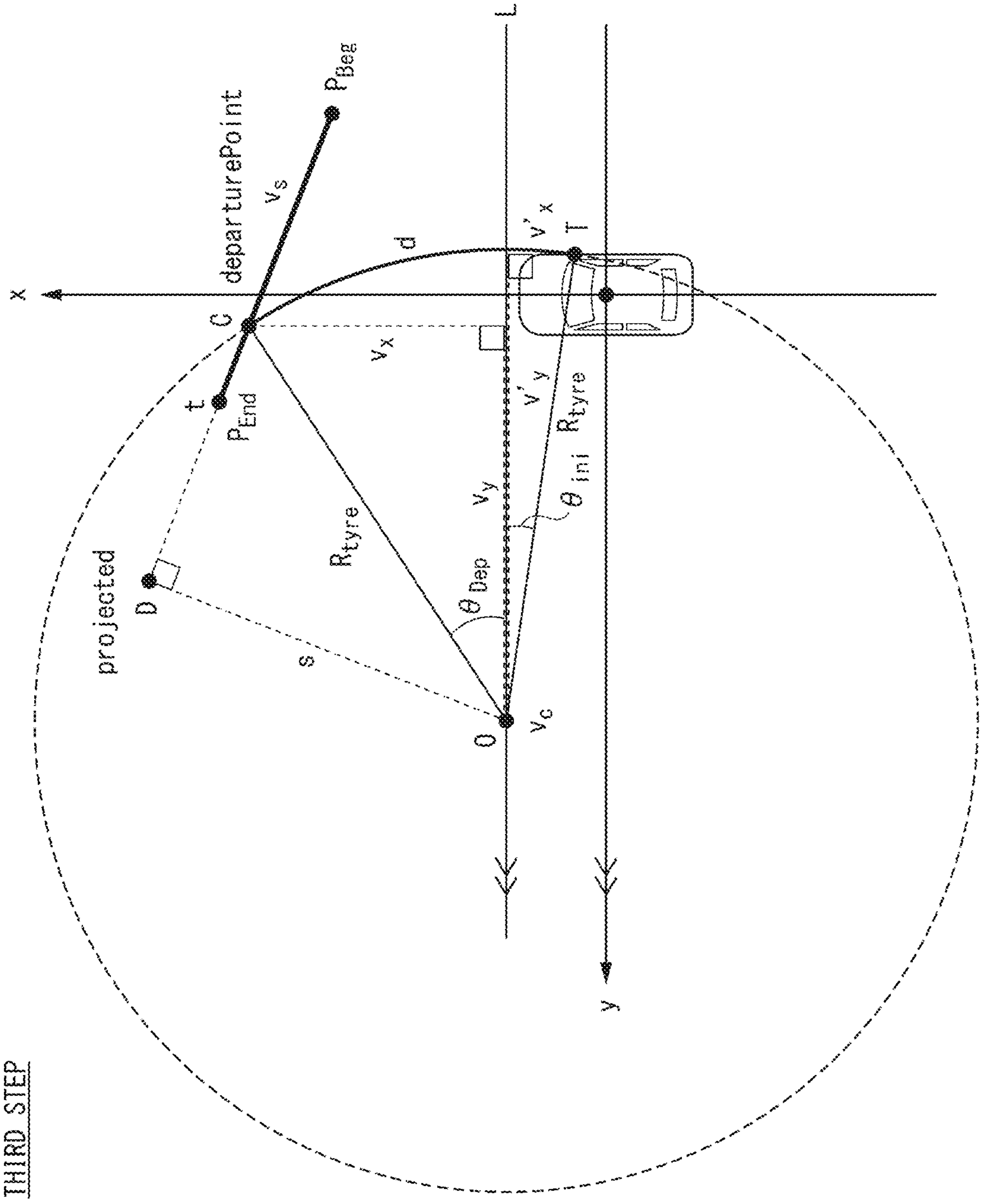
FIG. 9 is a third view for describing the method of calculating the deviation route length of the host vehicle during the curve traveling in the deviation determination.

FIG. 7, FIG. 8, and FIG. 9 are views for describing a method of calculating a deviation route length of the host vehicle during curve traveling in the deviation determination. More specifically, the method of calculating a deviation route length is divided into a first step of finding first coordinates, a second step of finding second coordinates, and a third step of finding the deviation route length based on the results of the first and second steps. FIG. 7, FIG. 8, and FIG. 9 show examples in which the moving trajectory (i.e., predicted route) of the tire of the host vehicle, which is turning around the turning center O, intersects with a line segment formed by two adjacent points ($P_{Beg}$ and $P_{End}$) among the marking line point group Pn at a departure point C. Hereinafter, the line segment is referred to as "an intersection line segment."

FIG. 7 is a view for describing a method of calculating first coordinates in the first step. In the first step, the third controller 180 calculates a coordinate "projected" (first coordinate) of a third apex D of a right triangle while having $P_{Beg}$ as a first apex and the turning center O as a second apex. Here, the coordinate of the first apex $P_{Beg}$ (segBeg) is known by determining the departure point C, and the coordinates of the second apex O ($v_c$) are known values calculated based on an initial position of the tire, the moving speed $v_{tyre}$ and the turning radius $R_{tyre}$ of the tire, as described in FIG. 6. In this case, the third controller 180 can calculate a ration between the length from the first apex $P_{Beg}$ to the third apex D and the length of the intersection line segment by taking the inner product of the vectors as shown in the following Equation (3).

[Math. 3]

$$\text{ratio}_h = \frac{v_p \cos\phi}{v_s} = \frac{v_s \cdot v_p}{|v_s| \cdot |v_s|} \tag{3}$$

In Equation (3), $v_s$ is a vector from $P_{Beg}$ to $P_{End}$, and $v_p$ is a vector from $P_{Beg}$ to the turning center O. φ is an angle formed by the vectors $v_s$ and $v_p$. Next, the third controller 180 can calculate the coordinates "projected" of the third apex D by performing vector calculation using the following Equation (4) based on the ration obtained in Equation (3).

[Math. 4]

$$\text{projected} = segBeg + \text{ratio}_h * v_s \tag{4}$$

FIG. 8 is a view for describing a method of calculating second coordinates in the second step. In the second step, the third controller 180 calculates the coordinates (second coordinates) of the departure point C based on the first coordinates (projected) calculated in the first step. First, the third controller 180 calculates a distance s from the turning center O to the third apex D using the following Equation (5). In Equation (5), $v_c$ is coordinates of the turning center O.

[Math. 5]

$$s = |\text{projected} - v_c| \tag{5}$$

Next, the third controller 180 calculates a distance t from the departure point C to the third apex D using the following Equation (6). In Equation (6), $R_{tyre}$ is a turning radius of a tire T obtained in Equation (2).

[Math. 6]

$$t = \sqrt{(R_{tyre})^2 - s^2} \tag{6}$$

Next, the third controller 180 can calculate the coordinates (departurePoint) of the departure point C by the following Equation (7).

[Math. 7]

$$departurePoint = \text{projected} - t * \frac{v_s}{|v_s|} \tag{7}$$

FIG. 9 is a view for describing a method of calculating the deviation route length d in the third step. First, the third controller 180 calculates the angle $\theta_{Dep}$ between a line segment connecting the turning center O and the departure point C and a straight line L that passes through the turning center O and is parallel to the y-axis, using the following Equation (8). In Equation (8), $v_x$ is a length of a perpendicular line drawn from the departure point C to the straight line L, and is calculated based on the y coordinates of the turning center O, the y coordinates of the departure point C, and the turning radius $R_{tyre}$. In addition, $v_y$ is a length of a line segment connecting the foot of the perpendicular line to the turning center O, and is calculated based on the y coordinate of the turning center O and the y coordinate of the departure point C.

[Math. 8]

$$\theta_{Dep} = \tan\left(\frac{v_x}{v_y}\right) \tag{8}$$

Next, the third controller 180 calculates the angle $\theta_{ini}$ between the line segment connecting the turning center O and the initial position of the tire T and the straight line L using the following Equation (9). When the turning direction is set as the positive direction based on the straight line L, the $\theta_{Dep}$ becomes a positive angle and $\theta_{ini}$ becomes a negative angle, so a difference between $\theta_{Dep}$ calculated by Equation (8) and $\theta_{ini}$ becomes the angle where the host vehicle turns from the initial position (the initial position of the tire T) to the departure point C. In Equation (9), $v_x'$ is a length of the perpendicular line drawn from the initial position to the straight line L, and is calculated based on the x coordinate of the initial position and the x coordinate of the turning center O. In addition, $v_y'$ is a length of the line segment connecting the foot of the perpendicular line and the turning center O, and is calculated based on the y coordinate of initial position and the y coordinate of the turning center O.

[Math. 9]

$$\theta_{Ini} = \tan\left(\frac{v_x'}{v_y'}\right) \tag{9}$$

Then, the third controller 180 can calculate the deviation route length d using the following Equation (10).

[Math. 10]

$$d = R_{tyre}(\theta_{Dep} - \theta_{Ini}) \tag{10}$$

Based on the deviation route length d and the turning speed $v_{tyre}$ obtained as described above, the third controller 180 can calculate the time (i.e., TTLC) required for the host vehicle to reach the departure point C from the initial position. Further, when the vehicle is traveling on a curve, it is assumed that $\theta_{ini}$ is sufficiently small compared to $\theta_{Dep}$. In this case, the third controller 180 may be configured to reduce the processing load of the deviation determination by approximating $\theta_{ini}$ to zero so as to reduce the amount of calculation, as long as the determination accuracy of the deviation determination is acceptable. Further, approximating $\theta_{ini}$ to zero means that the initial position of the tire T is on the straight line L. Accordingly, the third controller 180 sets the turning center O to the side of the host vehicle.

According to the above-mentioned embodiment, since the deviation determination can be made based on the predicted route of the turning and moving host vehicle, it is possible to more appropriately perform the deviation determination when the host vehicle is traveling on a curve.

Further, in the embodiment, although the case in which the deviation determination is performed when the host vehicle is traveling on a curve has been described, the deviation determination using the above-mentioned method may also be performed when traveling other than on the curve. In this case, the third controller 180 may calculate the predicted route of the host vehicle in a manner different from the above. For example, when the host vehicle is traveling in an approximately straight line (yaw rate is sufficiently small), the third controller 180 may calculate a predicted route based on the vehicle speed, acceleration, direction of advance, or the like, of the host vehicle. In addition, for example, the third controller 180 may use information about the route that the host vehicle has traveled up to the current control period in calculating of the predicted route.

In addition, in the embodiment, while the initial position of the host vehicle was set to the position of the front tire T, far from the turning center, and the predicted route was calculated starting from that initial position, the position of the tire T may be a ground position, and the initial position may be set to the end portion of the front of the vehicle body, closer to the tire T. In other words, the initial position of the host vehicle may be the vehicle body end portion or ground-contact point of the host vehicle that is closest to the intersection segment. In addition, in this case, when $\theta_{ini}$ is sufficiently small, it can be said that the turning center O is set in a direction perpendicular with respect to the forward direction of the front surface of the host vehicle from the end portion or the ground-contact point close to the intersection segment.

The above-mentioned embodiment can be expressed as follows.

A vehicle control device including:

a storage device on which a program is stored; and a hardware processor, the hardware processor executing the program to:

recognize marking lines of a road on which a host vehicle is traveling;

calculate a predicted route of the host vehicle on the basis of a traveling state of the host vehicle;

determine whether each predetermined sections of the marking lines intersect with the predicted route; and calculate a margin time until the host vehicle reaches an intersection point between the predicted route and the marking line when it is determined that the predicted route will intersect with the marking line of the predetermined section and determine that the host vehicle is highly likely to deviate from the marking line when the margin time is equal to or smaller than a threshold.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control device comprising:

a processor that executes instructions to:

recognize marking lines of a road on which a host vehicle is traveling;

calculate a predicted route of the host vehicle on the basis of a traveling state of the host vehicle;

determine whether each predetermined sections of the marking lines intersect with the predicted route;

calculate a margin time until the host vehicle reaches an intersection point between the predicted route and the marking line when it is determined that the predicted route will intersect with the marking line of the predetermined section, and determine that the host vehicle is highly likely to deviate from the marking line when the margin time is equal to or smaller than a threshold;

calculate the margin time using a turning curve based on a current traveling state of the host vehicle when the host vehicle is traveling with a turning movement;

perform a deviation notification regarding a marking line deviation to a driver when the margin time is equal to or less than the threshold;

perform a target trajectory generation, a speed control or a steering control which suppresses the marking line deviation after the deviation notification;

set a center of the turning curve to a side of the host vehicle;

calculate a first half-line from the center to an end portion or a ground-contact point of the host vehicle that is closest to the predetermined section, a second half-line from the center to a direction perpendicular to a forward direction of the vehicle; and calculate an angle between the first and second half-lines and make the angle about zero.

2. The vehicle control device according to claim 1, wherein the processor executes further instructions including calculate the predicted route using a turning curve based on a current traveling state of the host vehicle when the host vehicle is traveling with a turning movement.

3. A vehicle control method of causing a control device of a host vehicle to:

recognize marking lines of a road on which a host vehicle is traveling;

calculate a predicted route of the host vehicle on the basis of a traveling state of the host vehicle;

determine whether each predetermined sections of the marking lines intersect with the predicted route;

calculate a margin time until the host vehicle reaches an intersection point between the predicted route and the marking line when it is determined that the predicted route will intersect with the marking line of the predetermined section, and determine that the host vehicle is highly likely to deviate from the marking line when the margin time is equal to or smaller than a threshold;

calculate the margin time using a turning curve based on a current traveling state of the host vehicle when the host vehicle is traveling with a turning movement;

perform a deviation notification regarding a marking line deviation to a driver when the margin time is equal to or less than the threshold;

perform a target trajectory generation, a speed control or a steering control which suppresses the marking line deviation after the deviation notification;

set a center of the turning curve to a side of the host vehicle;

calculate a first half-line from the center to an end portion or a ground-contact point of the host vehicle that is closest to the predetermined section, a second half-line from the center to a direction perpendicular to a forward direction of the vehicle; and calculate an angle between the first and second half-lines and make the angle about zero.

4. A computer-readable non-transitory storage medium on which a program is stored to cause a control device of a host vehicle to:

recognize marking lines of a road on which a host vehicle is traveling;

calculate a predicted route of the host vehicle on the basis of a traveling state of the host vehicle;

determine whether each predetermined sections of the marking lines intersect with the predicted route;

calculate a margin time until the host vehicle reaches an intersection point between the predicted route and the marking line when it is determined that the predicted route will intersect with the marking line of the predetermined section and determine that the host vehicle is highly likely to deviate from the marking line when the margin time is equal to or smaller than a threshold;

calculate the margin time using a turning curve based on a current traveling state of the host vehicle when the host vehicle is traveling with a turning movement;

perform a deviation notification regarding a marking line deviation to a driver when the margin time is equal to or less than the threshold;

perform a target trajectory generation, a speed control or a steering control which suppresses the marking line deviation after the deviation notification;

set a center of the turning curve to a side of the host vehicle;

calculate a first half-line from the center to an end portion or a ground-contact point of the host vehicle that is closest to the predetermined section, a second half-line from the center to a direction perpendicular to a forward direction of the vehicle; and calculate an angle between the first and second half-lines and make the angle about zero.

* * * * *